United States Patent
Sakuyama et al.

(10) Patent No.: US 11,325,438 B2
(45) Date of Patent: May 10, 2022

(54) SUSPENSION

(71) Applicant: THK CO., LTD., Tokyo (JP)

(72) Inventors: Takashi Sakuyama, Tokyo (JP); Sho Taniguchi, Tokyo (JP); Tetsuhiro Nishide, Tokyo (JP); Satoshi Hirata, Tokyo (JP); Hiroshi Kaneshige, Tokyo (JP); Sho Iwashiro, Tokyo (JP)

(73) Assignee: THK CO., LTD., Tokyo (JP)

( * ) Notice: Subject to any disclaimer, the term of this patent is extended or adjusted under 35 U.S.C. 154(b) by 4 days.

(21) Appl. No.: 17/253,820

(22) PCT Filed: Jun. 7, 2019

(86) PCT No.: PCT/JP2019/022771
§ 371 (c)(1),
(2) Date: Dec. 18, 2020

(87) PCT Pub. No.: WO2020/003977
PCT Pub. Date: Jan. 2, 2020

(65) Prior Publication Data
US 2021/0206221 A1 Jul. 8, 2021

(30) Foreign Application Priority Data
Jun. 28, 2018 (JP) .............................. JP2018-123252

(51) Int. Cl.
*B60G 17/015* (2006.01)

(52) U.S. Cl.
CPC .... *B60G 17/0157* (2013.01); *B60G 2204/416* (2013.01); *B60G 2206/012* (2013.01)

(58) Field of Classification Search
CPC ............ B60G 17/0157; B60G 2200/44; B60G 2202/40; B60G 17/015; B60G 17/06;
(Continued)

(56) References Cited

U.S. PATENT DOCUMENTS

| 9,447,855 B2 * | 9/2016 | Mochizuki ............... H02K 7/06 |
| 2010/0059944 A1 | 3/2010 | Oteman et al. |

(Continued)

FOREIGN PATENT DOCUMENTS

| CN | 102431586 B | * 11/2015 |
| CN | 110466302 A | * 11/2019 |

(Continued)

OTHER PUBLICATIONS

International Search Report dated Jul. 23, 2019, issued in counterpart application No. PCT/JP2019/022771 (1 page).

*Primary Examiner* — Paul N Dickson
*Assistant Examiner* — Matthew D Lee
(74) *Attorney, Agent, or Firm* — Westerman, Hattori, Daniels & Adrian, LLP

(57) ABSTRACT

A suspension is provided which can not only generate a damping force between sprung mass and unsprung mass but also steer a wheel. A suspension includes: a shaft coupled to sprung mass of a vehicle, the shaft having a screw groove and a spline groove formed thereon; a ball screw nut assembled to the shaft via a ball; a ball spline nut assembled to the shaft via a ball; a ball screw-specific motor connected to the ball screw nut; a ball spline-specific motor connected to the ball spline nut; and a case coupled to unsprung mass of the vehicle, the case being configured to hold the ball screw-specific motor and the ball spline-specific motor. The ball spline-specific motor rotates the ball spline nut and the shaft relative to the case.

20 Claims, 7 Drawing Sheets

(58) Field of Classification Search
CPC ...... F16F 9/061; F16F 13/005; F16F 2232/06; F16F 15/03; B62D 5/0418; B62D 7/06
See application file for complete search history.

(56) References Cited

U.S. PATENT DOCUMENTS

| | | | | |
|---|---|---|---|---|
| 2013/0249464 A1* | 9/2013 | Knox | ................ | H02K 7/06 |
| | | | | 318/625 |
| 2016/0061281 A1* | 3/2016 | Lee | ................ | F16F 15/035 |
| | | | | 188/267 |

FOREIGN PATENT DOCUMENTS

| | | | | |
|---|---|---|---|---|
| CN | 110481257 A | * | 11/2019 | |
| JP | 2005-106106 A | | 4/2005 | |
| JP | 2008-303963 A | | 12/2008 | |
| JP | 2009-29246 A | | 2/2009 | |
| JP | 2011169433 A | * | 9/2011 | |
| JP | 2012-500375 A | | 1/2012 | |
| JP | 2012017818 A | * | 1/2012 | |
| WO | WO-2006112244 A1 | * | 10/2006 | ........... B60G 15/063 |

* cited by examiner

SUSPENSION

TECHNICAL FIELD

The present invention relates to a suspension for a vehicle, and particularly relates to a suspension including a ball screw.

BACKGROUND ART

A suspension including a ball screw has been proposed as a suspension for a vehicle. For example, Patent Literature 1 proposes a suspension including a ball screw, and a motor connected to a ball screw nut. In the suspension described in Patent Literature 1, the ball screw performs reverse operation, the nut rotates, and the motor functions as a generator while the sprung mass and the unsprung mass move closer to and farther from each other. Consequently, it is possible to generate a damping force between the sprung mass and the unsprung mass. Moreover, it is also possible to cause the motor to act as an actuator and actively generate a damping force in the suspension described in Patent Literature 1. In other words, the motor causes the ball screw to perform forward operation to move the screw shaft in the axial direction. Consequently, it is possible to actively generate an axial force (that is, a damping force) between the sprung mass and the unsprung mass.

CITATION LIST

Patent Literature

Patent Literature 1: JP 2009-29246 A

SUMMARY OF INVENTION

Technical Problem

However, in the suspension described in Patent Literature 1, the motor simply causes the axial force of the screw shaft to act between the sprung mass and the unsprung mass, and cannot steer a wheel. A wheel is steered by a steering system (such as a steering shaft, gear, tie rod, and power assist actuator) connected to a steering wheel.

If the suspension can steer a wheel, it is possible to eliminate the need for the steering system. Even if the steering system is equipped, it is possible to perform various types of control over the vehicle by steering the wheel by combined use of the steering system and the suspension.

Hence, the present invention is to provide a suspension that can not only generate a damping force between the sprung mass and the unsprung mass but also steer a wheel.

Solution to Problem

In order to solve the above problem, one aspect of the present invention is a suspension including: a shaft coupled to one of sprung mass and unsprung mass of a vehicle, the shaft having a screw groove and spline groove formed thereon; a ball screw nut assembled to the shaft via a ball; a ball spline nut assembled to the shaft via a ball; a ball screw-specific motor connected to the ball screw nut; a ball spline-specific motor connected to the ball spline nut; and a case coupled to the other of the sprung mass and the unsprung mass of the vehicle, the case being configured to hold the ball screw-specific motor and the ball spline-specific motor, in which the ball spline-specific motor rotates the ball spline nut and the shaft relative to the case.

Advantageous Effects of Invention

According to the present invention, the ball screw-specific motor connected to the ball screw nut generates a damping force between the sprung mass and the unsprung mass. Moreover, the ball spline-specific motor connected to the ball spline nut rotates the ball spline nut and the shaft relative to the case. Accordingly, it is possible to rotate the unsprung mass with respect to the sprung mass and therefore steer a wheel.

DESCRIPTION OF EMBODIMENTS

A suspension according to embodiments of the present invention is described in detail hereinafter with reference to the accompanying drawings. However, the suspension of the present invention can be embodied in various forms, and is not limited to the embodiments described in the present description. The embodiments are provided with the intention of allowing those skilled in the art to fully understand the scope of the invention by fully disclosing the description.

First Embodiment

Figure 1:
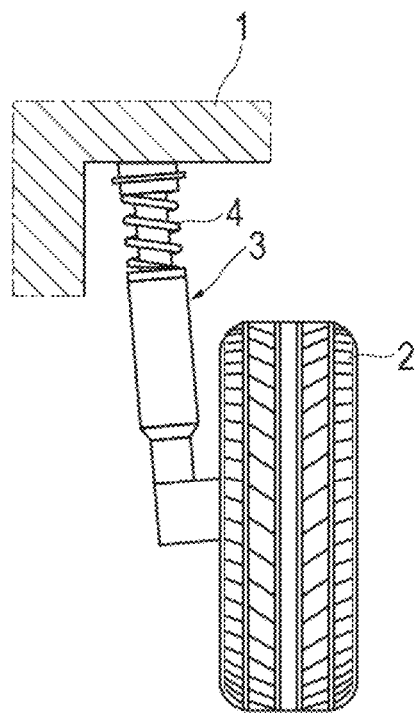
FIG. 1 is a front view of a suspension according to a first embodiment of the present invention (a front view as viewed from the front of a vehicle).

FIG. 1 is a front view of a suspension according to a first embodiment of the present invention (a front view as viewed from the front of a vehicle). A reference sign 1 denotes a vehicle body, and a reference sign 2 denotes a wheel. The vehicle body 1 and the wheel 2 are connected via a suspension 3 according to the embodiment. The suspension 3 includes a spring 4 such as a coil spring. A member that is supported by the spring 4 of the suspension 3 is referred to as the sprung mass. A member that is not supported by the spring 4 is referred to as the unsprung mass. The sprung mass is on the vehicle body 1 side. The unsprung mass is on the wheel 2 side. The suspension 3 is provided for each of four wheels 2, and is controlled by an electronic control unit (ECU) for each of the four wheels 2.

Figure 2:
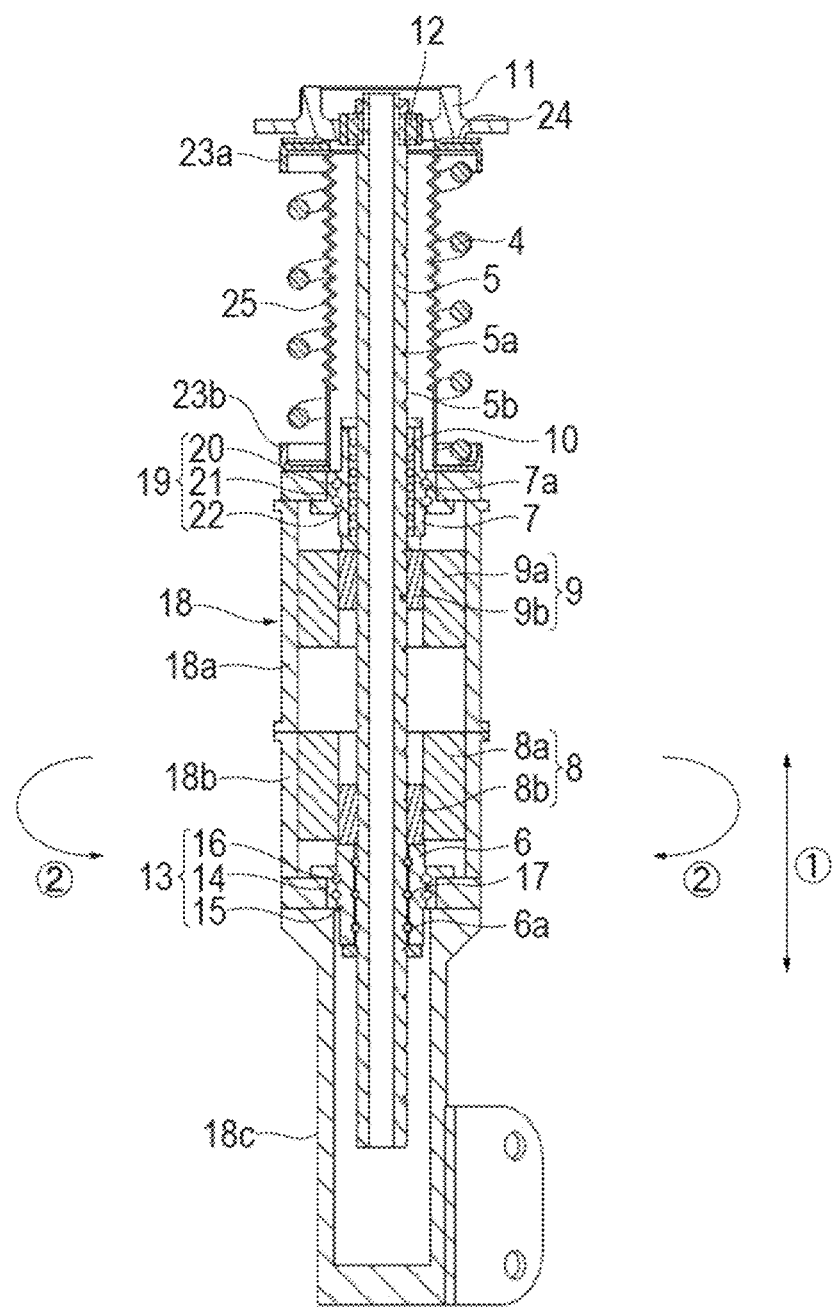
FIG. 2 is a vertical cross-sectional view of the suspension according to the first embodiment of the present invention.

FIG. 2 is a vertical cross-sectional view of the suspension 3 according to the embodiment. A reference sign 5 denotes a shaft, a reference sign 6 a ball screw nut, a reference sign 7 a ball spline nut, a reference sign 8 a ball screw-specific motor, a reference sign 9 a ball spline-specific motor, and a reference sign 18 a case. These components are described below in turn.

A helical screw groove 5a having a predetermined lead is formed in an outer surface of the shaft 5. Moreover, a linear spline groove 5b extending in the axial direction is formed in the outer surface of the shaft 5. The screw groove 5a and the spline groove 5b intersect with each other. The screw groove 5a is formed in such a manner as to be deeper than the spline groove 5b at the portion of intersection of the screw groove 5a and the spline groove 5b. Consequently, a ball 17 that rolls along the screw groove 5a is prevented from climbing over a level difference between the screw groove 5a and the spline groove 5b and going off course into the spline groove 5b. A ball 10 that rolls along the spline groove 5b is held by a retainer of the ball spline nut 7. Consequently, the ball 10 that rolls along the spline groove 5b is prevented from going off course into the screw groove 5a at the portion of intersection. The shaft 5 is hollow.

An upper end portion of the shaft 5 is coupled to a flange 11 that is mounted on the vehicle body 1. The upper end portion of the shaft 5 is provided with a joint 12 such as a rubber bushing or spherical joint. The upper end portion of the shaft 5 is coupled to the flange 11 via the joint 12. The joint 12 plays a role in constraining the rotation of the shaft 5 and absorbing an error in alignment between the shaft 5 and the flange 11.

The ball screw nut 6 is assembled to the shaft 5 via the ball 17. The ball screw nut 6 is placed below the ball spline nut 7. A helical screw groove 6a facing the screw groove 5a of the shaft 5 is formed in an inner surface of the ball screw nut 6. The ball 17 is disposed between the screw groove 6a of the ball screw nut 6 and the screw groove 5a of the shaft 5 in such a manner as to be capable of rolling motion. The ball screw nut 6 is provided with a circulation path that circulates the ball 17.

The ball screw nut 6 is rotatably supported by a bearing 13. The bearing 13 includes an outer ring 14, an inner ring 15 integral with the ball screw nut 6, and a bearing ball 16 disposed between the outer ring 14 and the inner ring 15. The outer ring 14 is fixed to the case 18. The ball screw nut 6 is rotatably supported by the case 18.

The ball spline nut 7 is assembled to the shaft 5 via the ball 10. A linear spline groove 7a facing the spline groove 5b of the shaft 5 is formed in an inner surface of the ball spline nut 7. The ball 10 is disposed between the spline groove 5b of the shaft 5 and the spline groove 7a of the ball spline nut 7 in such a manner as to be capable of rolling motion. The ball spline nut 7 includes a retainer that holds the ball 10. The ball spline nut 7 is provided with a circulation path that circulates the ball 10.

The ball spline nut 7 is rotatably supported by a bearing 19. The bearing 19 includes an outer ring 21, an inner ring 22 integral with the ball spline nut 7, and a bearing ball 20 disposed between the outer ring 21 and the inner ring 22. The outer ring 21 is fixed to the case 18. The ball spline nut 7 is rotatably supported by the case 18.

The ball screw-specific motor 8 is connected to the ball screw nut 6 and also held by the case 18. The ball screw-specific motor 8 includes a stator 8a and a rotor 8b. The stator 8a is fixed to the case 18. The rotor 8b is connected to the ball screw nut 6. The ball screw-specific motor 8 is a hollow motor, and the shaft 5 penetrates the ball screw-specific motor 8.

The ball spline-specific motor 9 is connected to the ball spline nut 7 and also held by the case 18. The ball spline-specific motor 9 includes a stator 9a and a rotor 9b. The stator 9a is fixed to the case 18. The rotor 9b is connected to the ball spline nut 7. The ball spline-specific motor 9 is a hollow motor, and the shaft 5 penetrates the ball spline-specific motor 9. The ball screw nut 6, the ball screw-specific motor 8, the ball spline-specific motor 9, and the ball spline nut 7 are arranged in the axial direction of the shaft 5. The ball screw-specific motor 8 and the ball spline-specific motor 9 are placed between the ball screw nut 6 and the ball spline nut 7.

The ball screw-specific motor 8 and the ball spline-specific motor 9 are housed in the case 18. The case 18 includes a first case 18a where the ball spline-specific motor 9 is housed, a second case 18b where the ball screw-specific motor 8 is housed, and a third case 18c where a lower end portion of the shaft 5 is housed. A lower end portion of the case 18 is coupled to a knuckle of the wheel 2.

The spring 4 is disposed between an upper end portion of the case 18 and the flange 11. The inner diameter of the spring 4 is smaller than the outer diameter of the case 18. The spring 4 is placed above the case 18, displaced in the axial direction. Spring receivers 23a and 23b are provided to both end portions of the spring 4. A bearing 24 is disposed between the flange 11 and the spring receiver 23a to allow the rotation of the case 18 with respect to the flange 11. A bellows 25 is placed inside the spring 4. The bellows 25 is disposed between the spring receivers 23a and 23b, and covers an upper part of the shaft 5 that protrudes from the case 18.

The operation of the suspension 3 according to the embodiment is described below. While the sprung mass (the vehicle body 1 side) and the unsprung mass (the wheel 2 side) move closer to and farther from each other on the uneven road surface, the spring 4 extends and contracts, and the shaft 5 and the case 18 move in the axial direction relative to each other. As a result, the ball screw nut 6 rotates with respect to the shaft 5 on the basis of the reverse operation of the ball screw (the shaft 5 and the ball screw nut 6), and the ball screw-specific motor 8 functions as a generator (absorber). Consequently, it is possible to generate a damping force between the sprung mass and the unsprung mass.

Moreover, the ball screw-specific motor 8 according to the embodiment also functions as an actuator that actively generates an axial force between the sprung mass (the vehicle body 1 side) and the unsprung mass (the wheel 2 side). In other words, the ball screw-specific motor 8 drives the ball screw nut 6 rotationally, and moves the ball screw nut 6 in the axial direction with respect to the shaft 5, and moves the case 18 in the axial direction (a direction (1)) with respect to the shaft 5. According to the Skyhook theory, it is possible to absorb a shock by causing the wheel 2 to move up and down along the uneven road surface under control over the ball screw-specific motor 8. Moreover, the ball screw-specific motor 8 has the function as an actuator. Accordingly, it is possible to reduce the inclination (roll) of the vehicle body 1 at a curve or the inclination (pitch) of the vehicle body 1 during acceleration or deceleration, let a user to freely change the height of the vehicle during travel or a stop, and reduce the height of the vehicle upon getting on and off the vehicle.

The ball screw-specific motor 8 according to the embodiment can function only as an absorber, only as an actuator, or as both of an absorber and an actuator, by changing control of the ECU.

When the ball spline-specific motor 9 drives the ball spline nut 7 rotationally, the case 18, together with the ball spline nut 7, rotates with respect to the shaft 5 (the rotation is indicated by (2)). Consequently, the unsprung mass (the wheel 2 side) can be rotated with respect to the sprung mass (the vehicle body 1 side); therefore, the wheel 2 can be steered. If the suspension 3 can steer the wheel 2, it is possible to eliminate the need for the steering system. Even if the steering system is equipped, it is possible to perform various types of control over the vehicle by steering the wheel 2 by combined use of the steering system and the suspension 3. For example, when the vehicle is oversteering, it is possible to steer the wheel 2 in a direction opposite to a turn direction to avoid spinning of the vehicle. Moreover, when the vehicle is travelling at high speed, it is possible to adjust the toe-in of the wheel 2 to improve the stability of the vehicle. Furthermore, it is possible to facilitate parking by turning the wheels 2 upon parking (for example, when parallel parking between other vehicles A and B beside a wall, the vehicle can turn the wheels 2, move toward the wall and into a space between the other vehicles A and B, and then return the wheels 2 to the straight ahead position from the turn angle).

When the ball spline-specific motor 9 drives the ball spline nut 7 rotationally, the case 18 is forced to move in the axial direction with respect to the shaft 5 due to the forward operation of the ball screw (the shaft 5 and the ball screw nut 6). In order to avoid it, the ball screw-specific motor 8 rotates the ball screw nut 6 by the same amount of rotation as that of the ball spline nut 7.

The configuration and operation of the suspension 3 according to the embodiment are described above. The suspension 3 according to the embodiment has the following effects:

The ball screw-specific motor 8 and the ball spline-specific motor 9 are hollow motors where the shaft 5 penetrates. Accordingly, it is possible to make the suspension 3 slim and place the suspension 3 in a limited space between the sprung mass and the unsprung mass.

The ball screw-specific motor 8 and the ball spline-specific motor 9 are placed between the ball screw nut 6 and the ball spline nut 7. Accordingly, it is possible to increase the support span of the shaft 5 based on the ball screw nut 6 and the ball spline nut 7 and stabilize the rotation and axial movement of the shaft 5.

The shaft 5 is coupled to the sprung mass. The case 18 is coupled to the unsprung mass. The ball screw nut 6 is placed below the ball spline nut 7. Accordingly, the weight of the vehicle body 1 is transferred to the wheel 2 via the shaft 5, the ball screw nut 6, and a portion of the case 18 below the ball screw nut 6. The weight of the vehicle body 1 is not applied to a portion of the case 18 above the ball screw nut 6. Accordingly, it is possible to thin the wall of the case 18, and it becomes possible to reduce the weight and outer diameter of the case 18.

The inner diameter of the spring 4 that supports the sprung mass is smaller than the outer diameter of the case 18. The spring 4 is placed above the case 18. Accordingly, it becomes possible to reduce the outer diameter of the suspension 3.

Second Embodiment

Figure 3:
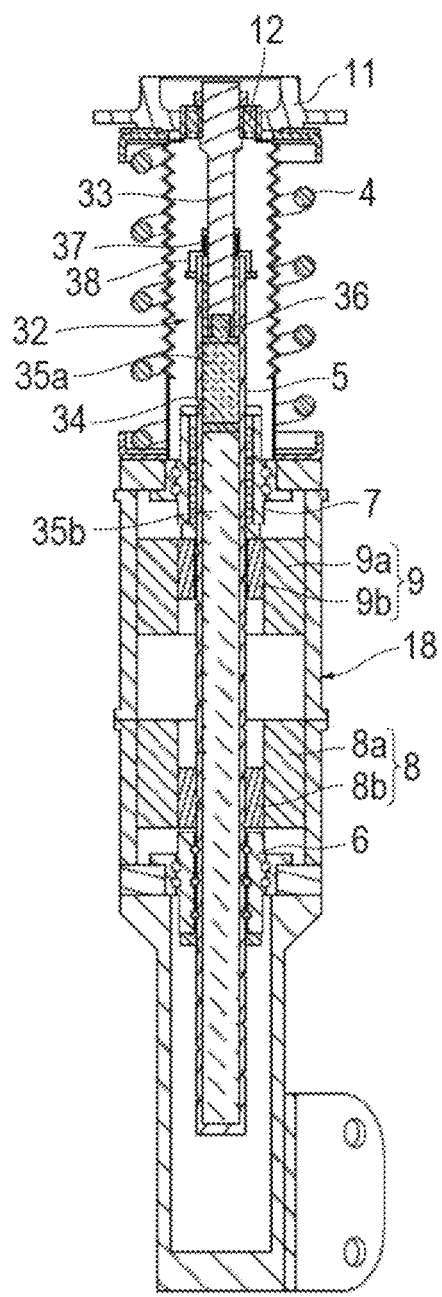
FIG. 3 is a vertical cross-sectional view of a suspension according to a second embodiment of the present invention.

FIG. 3 illustrates a vertical cross-sectional view of a suspension 31 according to a second embodiment of the present invention. The suspension 31 according to the second embodiment is the suspension 3 according to the first embodiment including a damper 32 added thereto. The damper 32 plays a role in absorbing vibration caused by small unevenness of the road surface. If a ball screw-specific motor 8 always actively absorbs vibration caused by the unevenness of the road surface, it is necessary to always minutely operate the ball screw (a shaft 5 and a ball screw nut 6). In order to prevent it, the damper 32 passively absorbs vibration caused by the small unevenness of the road surface. The ball screw-specific motor 8 actively absorbs vibration caused by great unevenness of the road surface. Accordingly, the control of the ball screw-specific motor 8 is simplified. It becomes possible to prevent damage such as fretting wear and indentation to the ball screw (the shaft 5 and the ball screw nut 6).

The configurations of a flange 11, a spring 4, a case 18, the ball screw-specific motor 8, a ball spline-specific motor 9, the ball screw nut 6, and a ball spline nut 7 according to the second embodiment are substantially the same as in the first embodiment. Accordingly, the same reference signs are assigned to the components, and descriptions thereof are omitted.

The damper 32 includes a damper shaft 33 disposed between the flange 11 and the shaft 5. An upper end portion of the damper shaft 33 is coupled to the flange 11 via a joint 12. A lower end portion of the damper shaft 33 is fitted in the hollow shaft 5 in such a manner as to be slidable relative to the shaft 5. The configuration of the shaft 5 is substantially the same as in the first embodiment. Accordingly, the same reference sign is assigned to the shaft 5, and a description thereof is omitted.

A partition plate 34 divides the inside of the shaft 5 into an oil chamber 35a and a gas chamber 35b. Oil as a hydraulic fluid is filled in the oil chamber 35a. Gas is filled in the gas chamber 35b. A piston 36 is fixed to the lower end portion of the damper shaft 33. A small-diameter hole that allows the oil to pass therethrough is made in the piston 36. The piston 36 moves up and down relative to the oil chamber 35a of the shaft 5. Accordingly, a damping force is generated to allow absorbing the vibration of the vehicle body 1 caused by small unevenness of the road surface. Along with the up-and-down movement of the piston 36, the partition plate 34 also moves up and down. The partition plate 34 is pressurized with the gas in the gas chamber 35b.

The damper shaft 33 and the shaft 5 are coupled by a ball spline 37 in such a manner as to be capable of relative movement in the axial direction and incapable of relative rotation. The upper end portion of the shaft 5 is sealed by a gasket 38.

Third Embodiment

Figure 4:
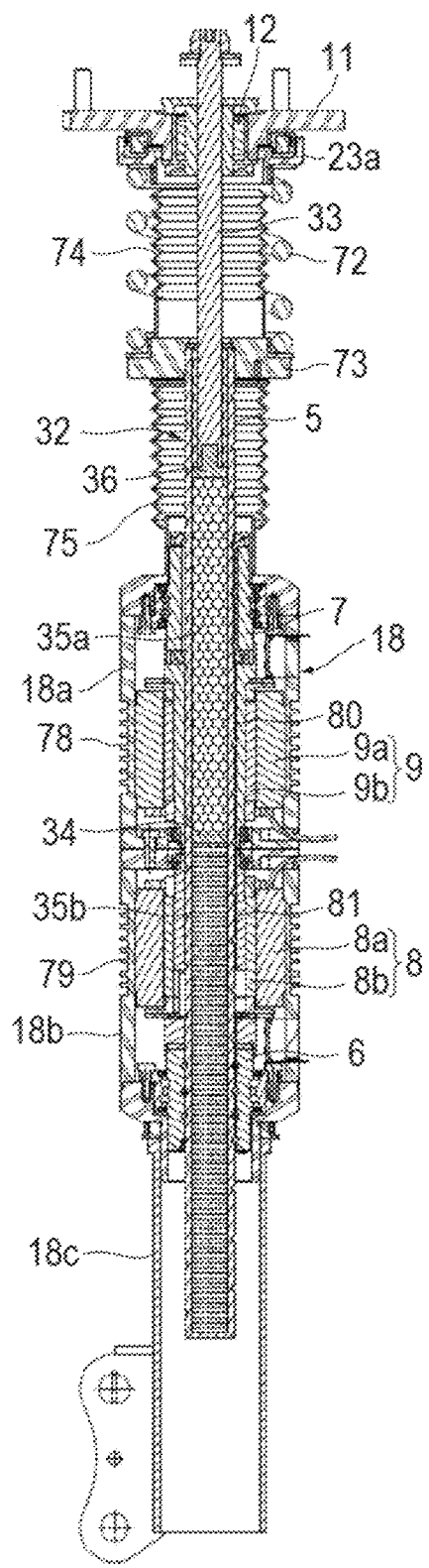
FIG. 4 is a vertical cross-sectional view of a suspension according to a third embodiment of the present invention.

FIG. 4 illustrates a vertical cross-sectional view of a suspension 71 according to a third embodiment of the present invention. The suspension 71 according to the third embodiment is a suspension where active vibration control using the ball screw-specific motor 8 and passive vibration control using the damper 32 according to the second embodiment are separated to be not influenced by each other.

The configurations of a case 18 (a first case 18a, a second case 18b, and a third case 18c), a ball screw-specific motor 8, a ball spline-specific motor 9, a ball screw nut 6, a ball spline nut 7, a shaft 5, and a damper 32 (a damper shaft 33, a piston 36, an oil chamber 35a, a gas chamber 35b, and a partition plate 34) are substantially the same as in the second embodiment. Accordingly, the same reference signs are assigned to the components, and descriptions thereof are omitted.

The spring 4 (refer to FIG. 3) is disposed between the flange 11 and the case 18 in the second embodiment, while a spring 72 is disposed between a flange 11 and an upper end portion of the shaft 5 in the third embodiment. In other words, a spring base 73 is fixed to the upper end portion of the shaft 5. The spring 72 is disposed between a spring receiver 23a on the flange 11 side and the spring base 73 on the shaft 5 side. The damper shaft 33 is covered with a bellows 74. An upper part of the shaft 5 is covered with a bellows 75.

As in the second embodiment, the damper shaft 33 is also coupled to the flange 11 via a joint 12 in such a manner as to be unrotatable in the third embodiment. The shaft 5 is coupled to the damper shaft 33 in such a manner as to be movable in the axial direction and unrotatable. A wheel 2 is coupled to the case 18. When the case 18 moves up and down due to the small unevenness of the road surface, the shaft 5, together with the case 18, is moved up and down by the ball screw nut 6. Hence, the shaft 5 moves up and down with respect to the damper shaft 33, and a damping force is generated in the damper 32. Therefore, the damper 32 can passively absorb vibration caused by the small unevenness of the road surface.

If the vibration caused by the unevenness of the road surface is actively absorbed using the ball screw-specific motor 8, the ball screw-specific motor 8 causes the ball screw (the shaft 5 and the ball screw nut 6) to perform forward operation to move the case 18 up and down along the uneven road surface. Consequently, it is possible to actively absorb the vibration caused by the uneven road surface. The upper end portion of the shaft 5 is coupled to the flange 11 via the spring 72. Even if the ball screw-specific motor 8 moves the case 18 up and down, the damper 32 does not go into operation. Hence, active vibration control and passive vibration control can be separated.

The suspension 71 according to the third embodiment has the effect that active vibration control using the ball screw-specific motor 8 and the passive vibration control using the damper 32 can be separated; accordingly it becomes easy to design the damper 32 and control the ball screw-specific motor 8.

In FIG. 4, the configurations of the ball screw-specific motor 8 and the ball spline-specific motor 9 are illustrated in detail. Specifically, a reference sign 80 denotes a cylindrical coupling portion fixed to the inner side of a rotor 9b of the ball spline-specific motor 9. The rotor 9b is coupled to the ball spline nut 7 via the cylindrical coupling portion 80. Similarly, a reference sign 81 denotes a cylindrical coupling portion fixed to the inner side of a rotor 8b of the ball screw-specific motor 8. The rotor 8b is coupled to the ball screw nut 6 via the cylindrical coupling portion 81. Reference signs 78 and 79 denote fins for cooling the ball spline-specific motor 9 and the ball screw-specific motor 8, respectively.

Fourth Embodiment

Figure 5:
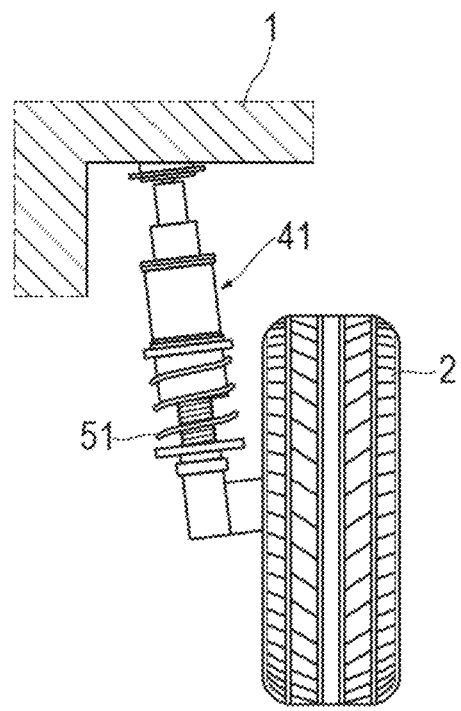
FIG. 5 is a front view of a suspension according to a fourth embodiment of the present invention (a front view as viewed from the front of a vehicle).

FIG. 5 is a front view of a suspension 41 according to a fourth embodiment of the present invention (a front view as viewed from the front of a vehicle). A reference sign 1 denotes a vehicle body, and a reference sign 2 a wheel. In the first embodiment, the shaft 5 is coupled to the vehicle body 1 side, and the case 18 is coupled to the wheel 2 side. In the fourth embodiment, a case 43 is coupled to the vehicle body 1 side, and a shaft 5 (refer to FIG. 6) is coupled to the wheel 2 side.

Figure 6:
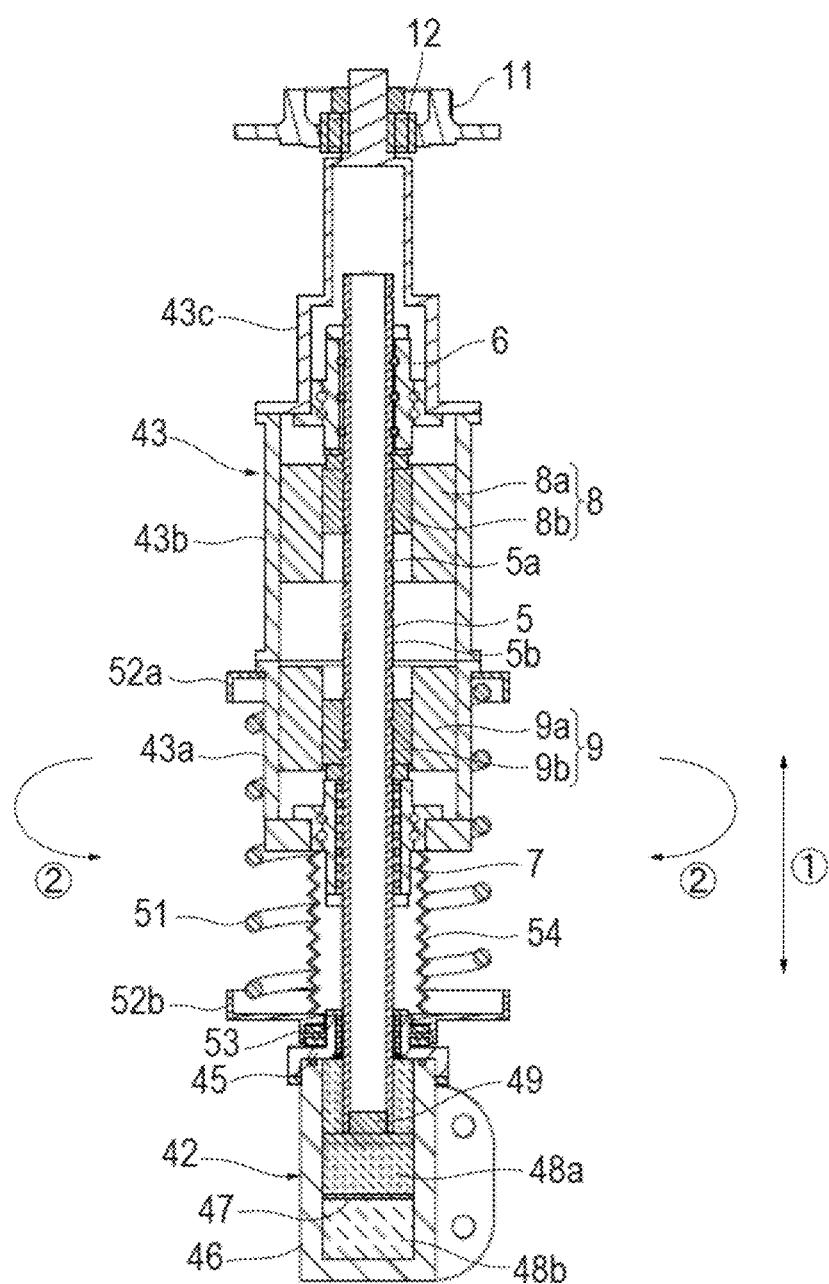
FIG. 6 is a vertical cross-sectional view of a suspension according to the fourth embodiment of the present invention.

FIG. 6 is a vertical cross-sectional view of the suspension 41 according to the fourth embodiment. The reference sign 5 denotes a shaft, a reference sign 6 a ball screw nut, a reference sign 7 a ball spline nut, a reference sign 8 a ball screw-specific motor, a reference sign 9 a ball spline-specific motor, the reference sign 43 a case, and a reference sign 42 a damper. These components are described below in turn.

The case 43 includes a first case 43a where the ball spline-specific motor 9 is housed, a second case 43b where the ball screw-specific motor 8 is housed, and a third case 43c where an upper end portion of the shaft 5 is housed. An upper end portion of the case 43 is coupled via a joint 12 to a flange 11 that is mounted on the vehicle body 1.

The shaft 5 is hollow. A helical screw groove 5a and a linear spline groove 5b are formed in an outer surface of the shaft 5. The shaft 5 is not coupled to the flange 11. The shaft 5 is moved up and down in the axial direction (a direction (1)) by the ball screw-specific motor 8 and the ball spline-specific motor 9, and rotates (the rotations is indicated by (2)).

The configurations of the ball screw nut 6, the ball spline nut 7, the ball screw-specific motor 8, and the ball spline-specific motor 9 are substantially the same as in the first embodiment. Accordingly, the same reference signs are assigned to the components, and descriptions thereof are omitted.

The damper 42 is coupled to a lower end portion of the shaft 5. The damper 42 includes a damper case 46 coupled to the shaft 5 via a ball spline 45. The ball spline 45 couples the shaft 5 and the damper case 46 in such a manner as to be movable in the axial direction and unrotatable. The damper case 46 is coupled to a knuckle of the wheel 2.

A partition plate 47 divides the inside of the damper case 46 into an oil chamber 48a and a gas chamber 48b. Oil as a hydraulic fluid is filled in the oil chamber 48a. Gas is filled in the gas chamber 48b. A piston 49 is fixed to the lower end portion of the shaft 5. A small-diameter hole that allows the oil to pass therethrough is made in the piston 49. The piston 49 moves up and down in the oil chamber 48a. Accordingly, a damping force is generated to allow absorbing the vibration of the vehicle body 1 caused by small unevenness of the road surface.

A spring 51 is disposed between the case 43 and the damper 42. The inner diameter of the spring 51 is larger than the outer diameter of the case 43. The spring 51 surrounds a part of the case 43. Spring receivers 52a and 52b are provided to both end portions of the spring 51. A bearing 53 is disposed between the spring receiver 52b and the damper 42 in such a manner as to allow the rotation of the damper 42 with respect to the spring 51. A bellows 54 is disposed between the spring receivers 52a and 52b, and covers a lower part of the shaft 5 that protrudes from the case 43.

The operation of the suspension 41 according to the fourth embodiment is described below. While the sprung mass (the vehicle body 1 side) and the unsprung mass (the wheel 2 side) move closer to and farther from each other on the uneven road surface, the spring 51 extends and contracts, and the case 43 and the shaft 5 move in the axial direction relative to each other. As a result, the ball screw nut 6 rotates with respect to the shaft 5 on the basis of the reverse operation of the ball screw (the shaft 5 and the ball screw nut 6), and the ball screw-specific motor 8 functions as a generator (absorber).

Moreover, the ball screw-specific motor 8 according to the embodiment also functions as an actuator that actively generates an axial force between the sprung mass (the vehicle body 1 side) and the unsprung mass (the wheel 2 side). In other words, the ball screw-specific motor 8 drives the ball screw nut 6 rotationally, and moves the shaft 5 in the axial direction with respect to the ball screw nut 6, and moves the shaft 5 in the axial direction with respect to the case 43. According to the Skyhook theory, it is possible to absorb a shock by causing the wheel 2 to move up and down along the uneven road surface under control over the ball screw-specific motor 8.

The ball screw-specific motor 8 according to the embodiment can function only as an absorber, as an actuator, or as both of an absorber and an actuator.

When the ball spline-specific motor 9 drives the ball spline nut 7 rotationally, the shaft 5, together with the ball spline nut 7, rotates with respect to the case 43. Consequently, the unsprung mass (the wheel 2 side) can be rotated with respect to the sprung mass (the vehicle body 1 side); therefore, the wheel 2 can be steered.

The suspension 41 according to the fourth embodiment has the following effects: The case 43, the ball screw-specific motor 8, and the ball spline-specific motor 9 are coupled to the sprung mass (the vehicle body 1 side). The weight of a portion (the shaft 5 and the damper 42) that moves in the axial direction and rotates is low. Hence, the suspension 41 can be operated with small energy.

The damper 42 passively absorbs vibration caused by small unevenness of the road surface. Accordingly, the ball screw-specific motor 8 is simply required to actively absorb vibration caused by great unevenness of the road surface. Hence, the control of the ball screw-specific motor 8 is simplified. It becomes possible to prevent damage such as fretting wear and indentation to the ball screw (the shaft 5 and the ball screw nut 6).

The case 43 is coupled to the sprung mass. The shaft 5 is coupled to the unsprung mass. The ball screw nut 6 is placed above the ball spline nut 7. Accordingly, the weight of the vehicle body 1 is transferred to the wheel 2 via a portion of the case 43 above the ball screw nut 6, the ball screw nut 6, the shaft 5, and the damper 42. The weight of the vehicle body 1 is not applied to a portion of the case 43 below the ball screw nut 6. Accordingly, it becomes possible to thin the wall of the case 43, and reduce the weight and outer diameter of the case 43.

The inner diameter of the spring 51 is larger than the outer diameter of the case 43. The spring 51 surrounds at least a part of the case 43. Accordingly, it is possible to stack the spring 51 and the case 43 in the axial direction and reduce the axial length of the suspension 41.

Fifth Embodiment

Figure 7:
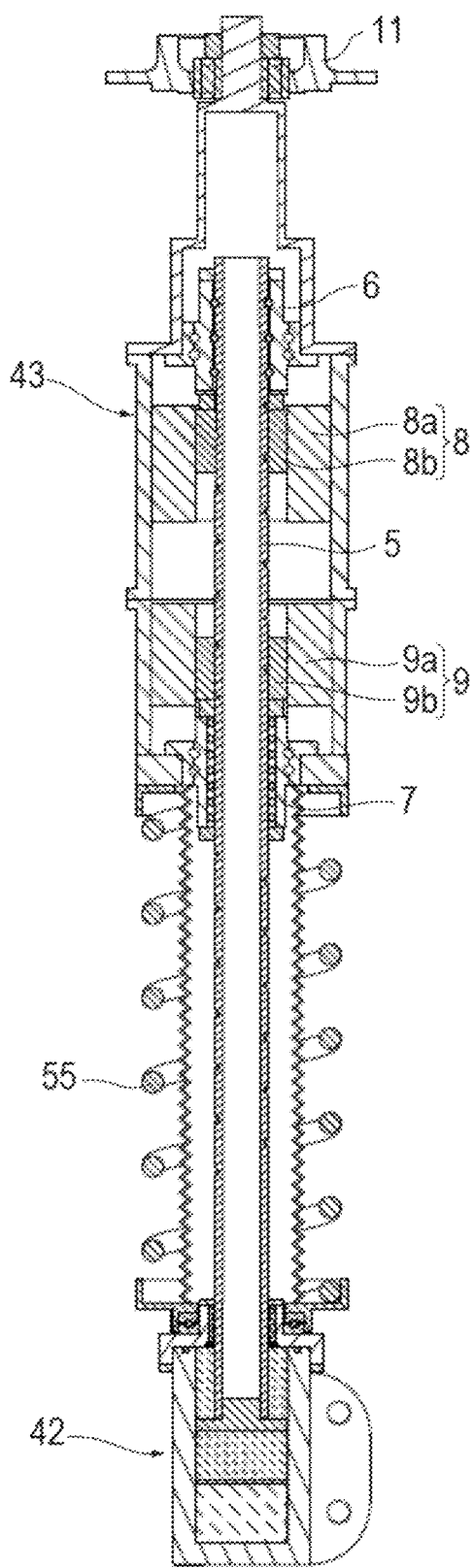
FIG. 7 is a vertical cross-sectional view of a suspension according to a fifth embodiment of the present invention.

FIG. 7 is a vertical cross-sectional view of a suspension 61 according to a fifth embodiment of the present invention. A reference sign 43 denotes a case, a reference sign 5 a shaft, a reference sign 6 a ball screw nut, a reference sign 7 a ball spline nut, a reference sign 8 a ball screw-specific motor, a reference sign 9 a ball spline-specific motor, and a reference sign 42 a damper. These components are substantially the same as the suspension 41 according to the fourth embodiment, except the point that the shaft 5 is longer. Accordingly, the same reference signs are assigned to the components, and descriptions thereof are omitted.

The inner diameter of the spring 51 is larger than the outer diameter of the case 43, and the spring 51 surrounds a part of the case 43 in the fourth embodiment, while the inner diameter of a spring 55 is smaller than the outer diameter of the case 43, and the spring 55 is placed between the case 43 and the damper 42, displaced in the axial direction from the case 43, in the fifth embodiment. The suspension 61 according to the fifth embodiment can be made smaller in outer diameter.

The present invention is not limited to the realization of the above embodiments, and can be modified to other embodiments within the scope that does not change the gist of the present invention.

For example, in the above embodiments, a coil spring is used as the spring that supports the sprung mass. However, an air spring can also be used.

According to the fourth and fifth embodiments, it is also possible to omit the damper in the suspension.

In the above embodiments, the ball screw nut and the ball spline nut are directly coupled to the ball screw-specific motor and the ball spline-specific motor. However, it is also possible to mount a reduction gear therebetween. Moreover, hollow motors where the shaft penetrates are used as the ball screw-specific motor and the ball spline-specific motor. However, it is also possible to use, for example, a geared motor offset from the shaft.

The configurations of the suspensions according to the above embodiments are examples. Other configurations can be adopted within the scope that does not change the gist of the present invention.

The present description is based on Japanese Patent Application No. 2018-123252 filed on Jun. 28, 2018, the entire contents of which are incorporated herein.

REFERENCE SIGNS LIST

3 Suspension
4 Spring
5 Shaft
5a Screw groove
5b Spline groove
6 Ball screw nut
7 Ball spline nut
8 Ball screw-specific motor
9 Ball spline-specific motor
10 Ball
17 Ball
18 Case
31 Suspension
32 Damper
33 Damper shaft
41 Suspension
42 Damper
43 Case
51 Spring
55 Spring
61 Suspension
71 Suspension
72 Spring

The invention claimed is:

1. A suspension comprising:
a shaft coupled to one of sprung mass and unsprung mass of a vehicle, the shaft having a screw groove and a spline groove formed thereon;
a ball screw nut assembled to the shaft via a ball;
a ball spline nut assembled to the shaft via a ball;
a ball screw-specific motor connected to the ball screw nut;
a ball spline-specific motor connected to the ball spline nut; and
a case coupled to the other of the sprung mass and the unsprung mass of the vehicle, the case being configured to hold the ball screw-specific motor and the ball spline-specific motor, wherein the ball spline-specific motor rotates the ball spline nut and the shaft relative to the case.

2. The suspension according to claim 1, wherein a damper is disposed between the one of the sprung mass and the unsprung mass and the shaft.

3. The suspension according to claim 2, wherein
at least a part of the shaft is formed in such a manner as to be hollow, and
oil for the damper is filled in the hollow portion of the shaft.

4. The suspension according to claim 2, wherein
the damper includes a damper shaft coupled at an upper end portion thereof to the sprung mass and coupled at a lower end portion thereof to the shaft in such a manner as to be movable in an axial direction relative to the shaft, and
a spring that supports the sprung mass is disposed between the sprung mass and an upper end portion of the shaft.

5. The suspension according to claim 1, wherein the ball screw-specific motor and the ball spline-specific motor are hollow motors where the shaft penetrates.

6. The suspension according to claim 5, wherein the ball screw-specific motor and the ball spline-specific motor are placed between the ball screw nut and the ball spline nut.

7. The suspension according to claim 1, wherein
the shaft is coupled to the sprung mass,
the case is coupled to the unsprung mass, and
the ball screw nut is placed below the ball spline nut.

8. The suspension according to claim 1, wherein
the case is coupled to the sprung mass,
the shaft is coupled to the unsprung mass, and
the ball screw nut is placed above the ball spline nut.

9. The suspension according to claim 1, wherein
an inner diameter of the spring that supports the sprung mass is larger than an outer diameter of the case, and
the spring surrounds at least a part of the case.

10. The suspension according to claim 1, wherein
an inner diameter of the spring that supports the sprung mass is smaller than an outer diameter of the case, and
the spring is placed, displaced in the axial direction from the case.

11. The suspension according to claim 3, wherein
the damper includes a damper shaft coupled at an upper end portion thereof to the sprung mass and coupled at a lower end portion thereof to the shaft in such a manner as to be movable in an axial direction relative to the shaft, and
a spring that supports the sprung mass is disposed between the sprung mass and an upper end portion of the shaft.

12. The suspension according to claim 2, wherein the ball screw-specific motor and the ball spline-specific motor are hollow motors where the shaft penetrates.

13. The suspension according to claim 3, wherein the ball screw-specific motor and the ball spline-specific motor are hollow motors where the shaft penetrates.

14. The suspension according to claim 4, wherein the ball screw-specific motor and the ball spline-specific motor are hollow motors where the shaft penetrates.

15. The suspension according to claim 11, wherein the ball screw-specific motor and the ball spline-specific motor are hollow motors where the shaft penetrates.

16. The suspension according to claim 2, wherein
the shaft is coupled to the sprung mass,
the case is coupled to the unsprung mass, and
the ball screw nut is placed below the ball spline nut.

17. The suspension according to claim 3, wherein
the shaft is coupled to the sprung mass,
the case is coupled to the unsprung mass, and
the ball screw nut is placed below the ball spline nut.

18. The suspension according to claim 4, wherein
the shaft is coupled to the sprung mass,
the case is coupled to the unsprung mass, and
the ball screw nut is placed below the ball spline nut.

19. The suspension according to claim 5, wherein
the shaft is coupled to the sprung mass,
the case is coupled to the unsprung mass, and
the ball screw nut is placed below the ball spline nut.

20. The suspension according to claim 6, wherein
the shaft is coupled to the sprung mass,
the case is coupled to the unsprung mass, and
the ball screw nut is placed below the ball spline nut.

* * * * *